F. J. FISHER.
CONVERTIBLE VEHICLE BODY CONSTRUCTION.
APPLICATION FILED JULY 21, 1915.

1,242,673.

Patented Oct. 9, 1917.
6 SHEETS—SHEET 1.

INVENTOR
Fred J. Fisher
BY
ATTORNEY

F. J. FISHER.
CONVERTIBLE VEHICLE BODY CONSTRUCTION.
APPLICATION FILED JULY 21, 1915.

1,242,673.

Patented Oct. 9, 1917.
6 SHEETS—SHEET 2.

INVENTOR
Fred J. Fisher
BY
Raymond A. Parker
ATTORNEY

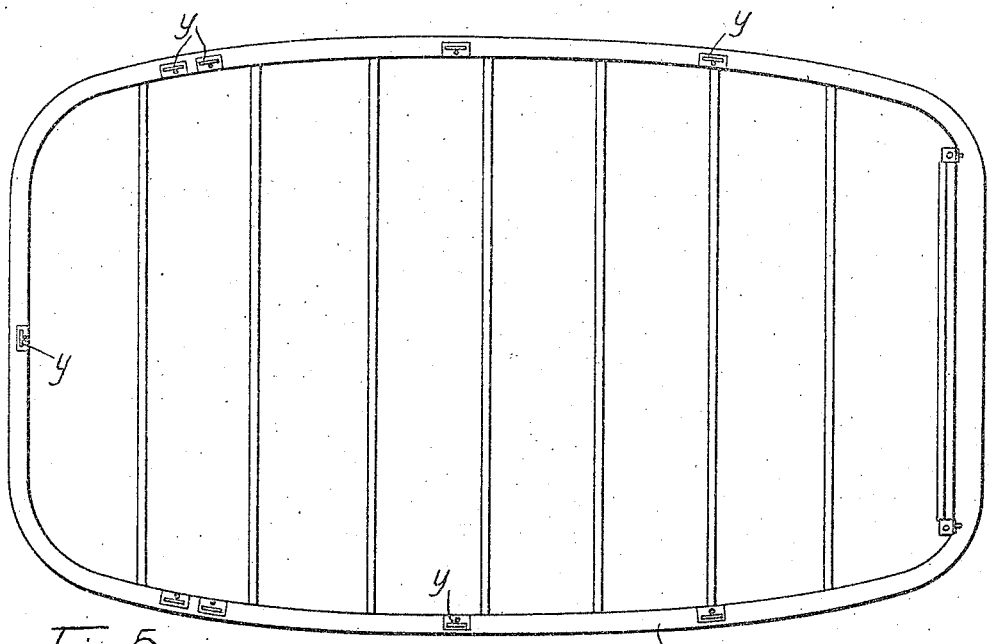
Fig. 5
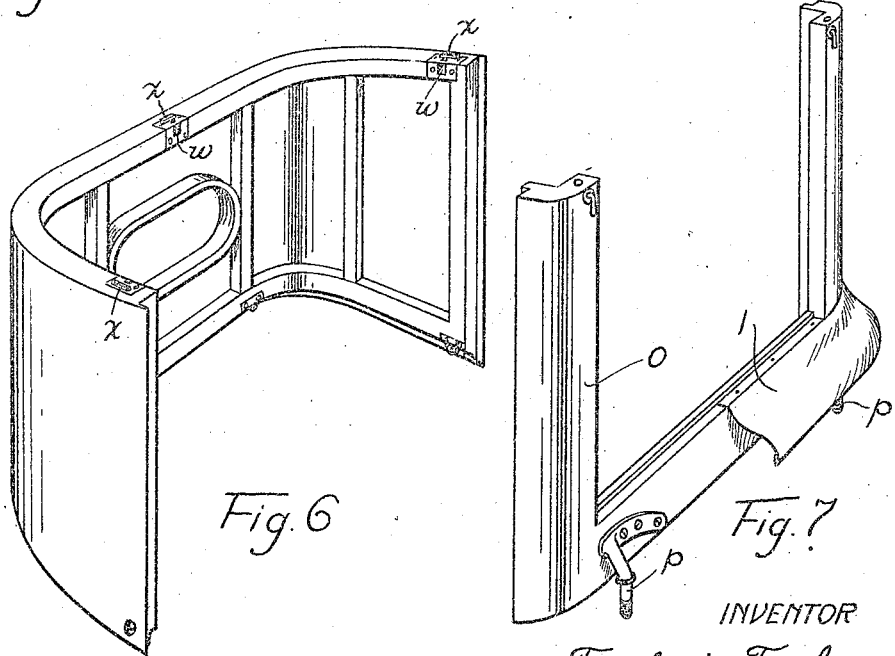
Fig. 6
Fig. 7

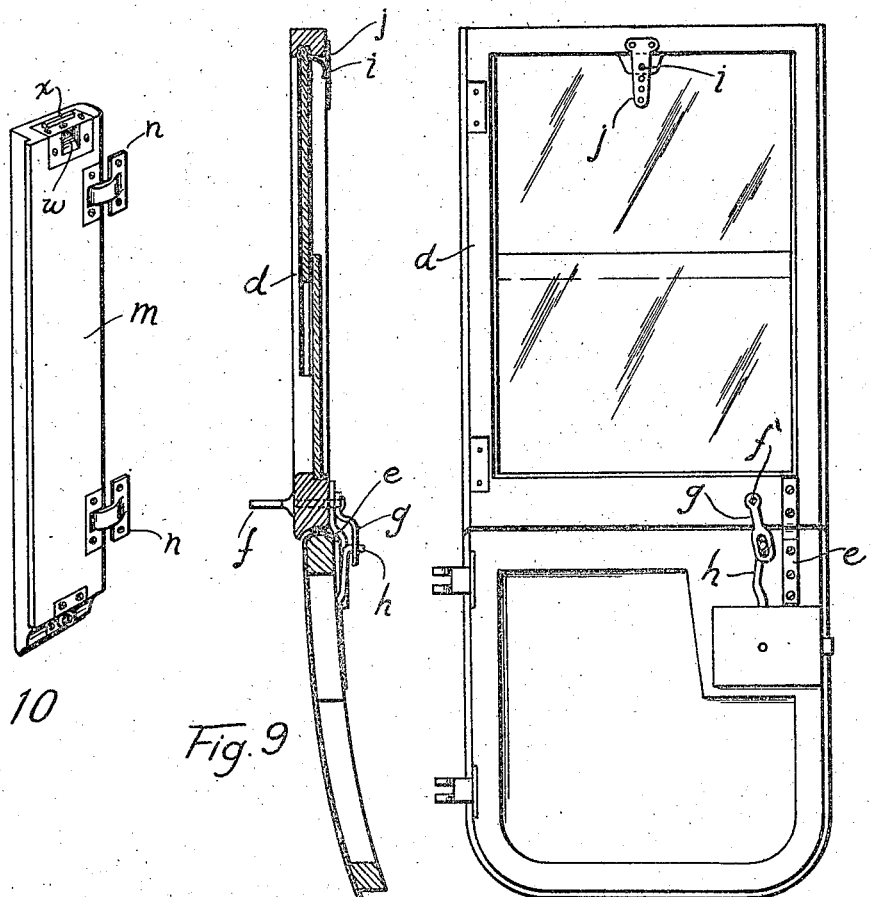
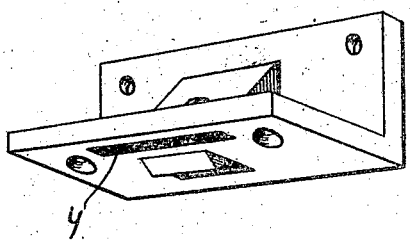
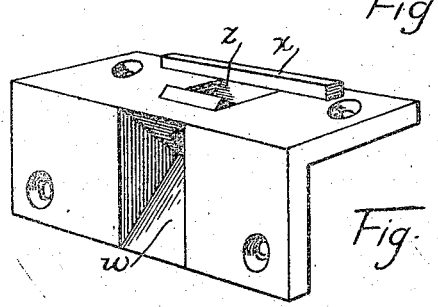

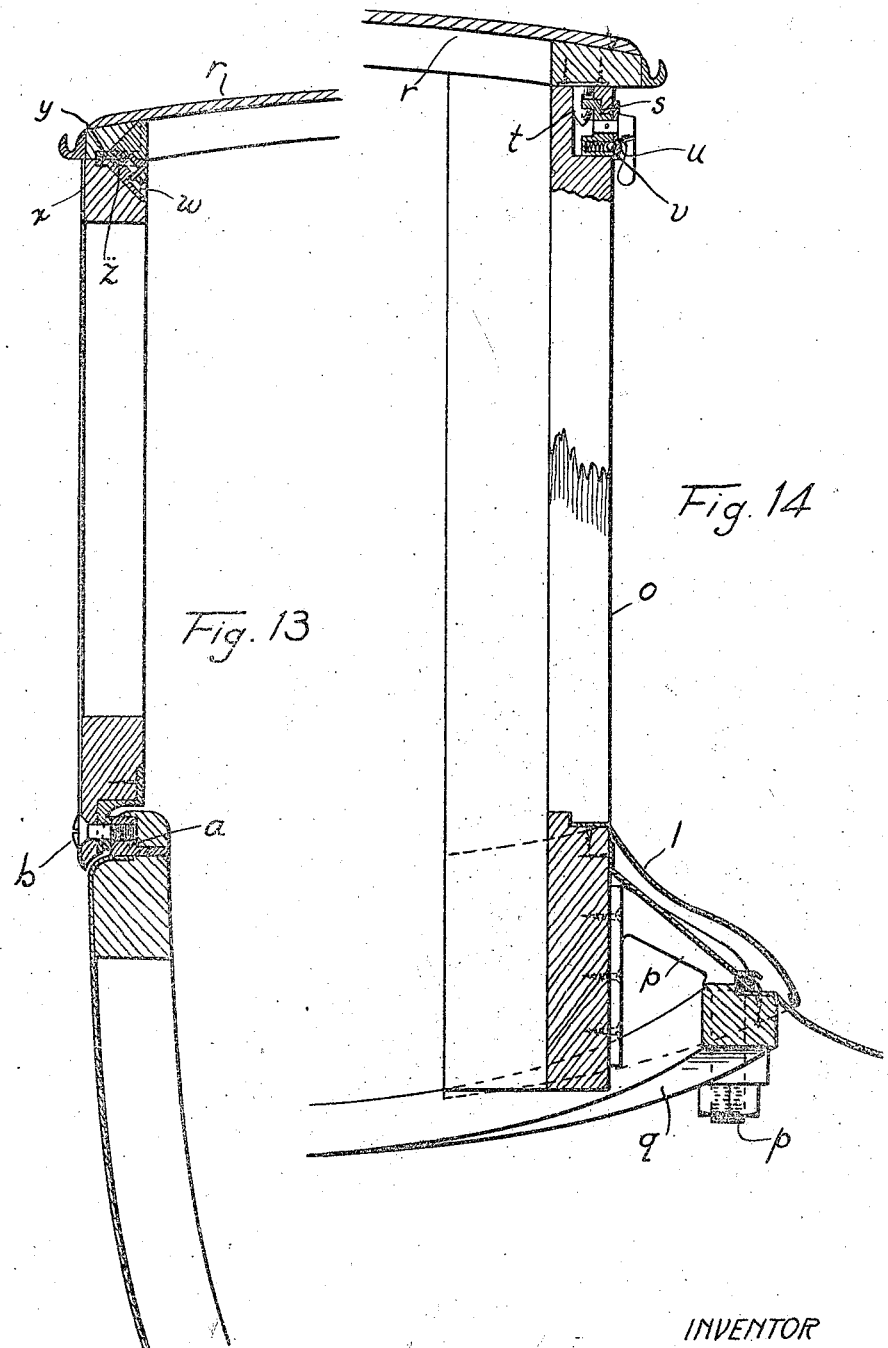

UNITED STATES PATENT OFFICE.

FRED J. FISHER, OF DETROIT, MICHIGAN, ASSIGNOR TO FISHER BODY CORPORATION, A CORPORATION OF NEW YORK.

CONVERTIBLE VEHICLE-BODY CONSTRUCTION.

1,242,673.   Specification of Letters Patent.   Patented Oct. 9, 1917.

Application filed July 21, 1915. Serial No. 41,036.

*To all whom it may concern:*

Be it known that I, FRED J. FISHER, a citizen of the United States, residing at Detroit, county of Wayne, State of Michigan, have invented a certain new and useful Improvement in Convertible Vehicle-Body Constructions, and declare the following to be a full, clear, and exact description of the same, such as will enable others skilled in the art to which it pertains to make and use the same, reference being had to the accompanying drawings, which form a part of this specification.

This invention relates to convertible automobile bodies, that is to say, automobile bodies which may be converted from the limousine or closed type to an open type body. It has for its object such a convertible body so constructed that it more nearly approaches in appearance a true limousine body when the top is on, while when the top is off it has all the appearance of an ordinary open body.

This object is accomplished by constructing the top in appropriate sections which fit together to make the same.

In the drawings,—

Fig. 5, is an inside view of the roof section.

Fig. 6, is a perspective of the back section viewed from the inside.

Fig. 7, is a perspective of the front section with a portion of the skirt omitted.

Fig. 8, is an inside elevation of the door and door section.

Fig. 9, is a vertical section of the same.

Fig. 10, is a perspective of the door post.

Fig. 11, is a perspective of the fastening device which goes on the roof section.

Fig. 12, is a perspective of the fastening device that goes on the side section on which it is adapted to interlock with the fastening device of Fig.

Fig. 13, is a vertical section through one side of the body and top.

Fig. 14, is a vertical section through the front of the body and top.

Figure 1:
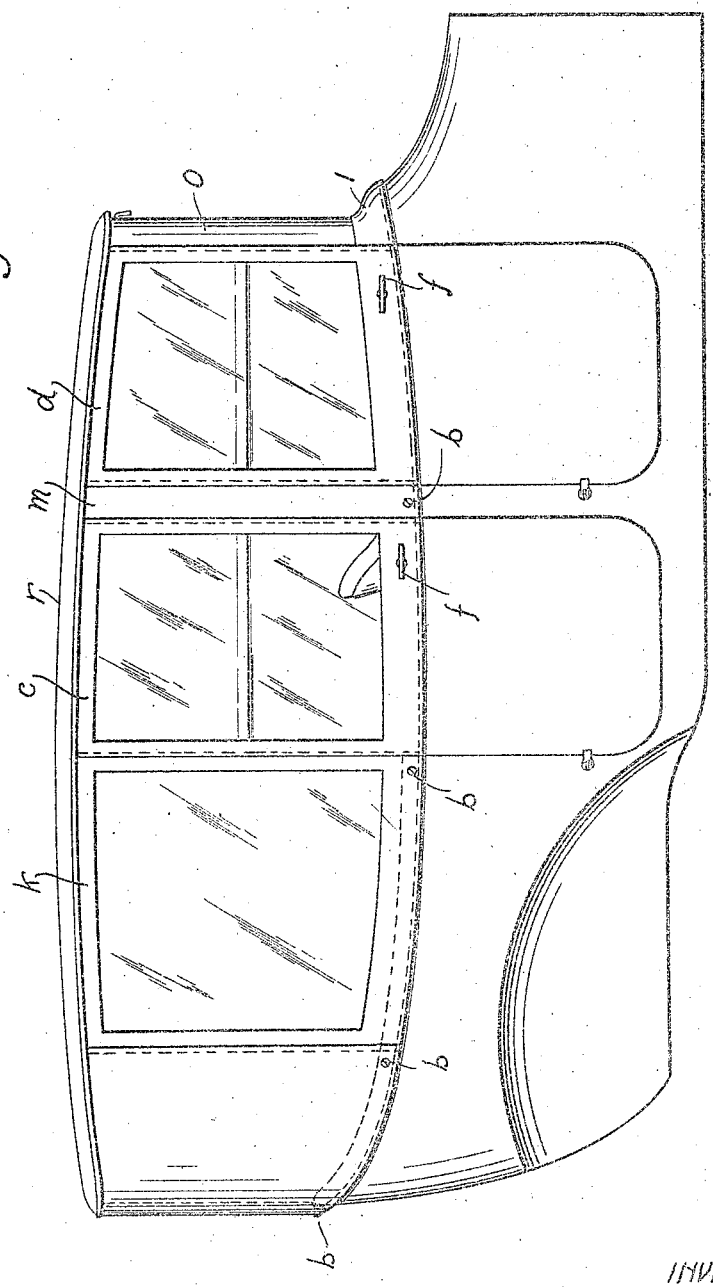
Figure 1, is a side elevation.
Figure 2:
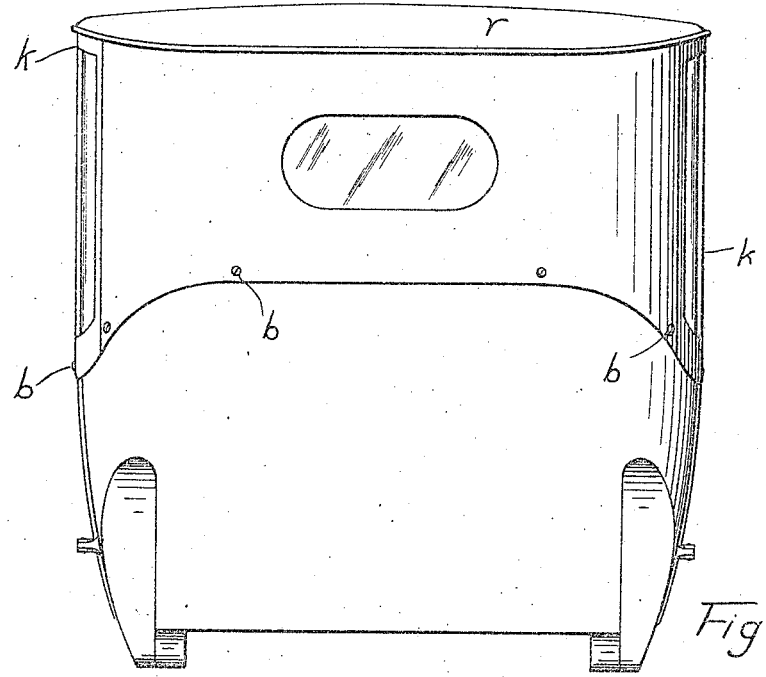
Fig. 2, is a rear elevation.
Figure 4:
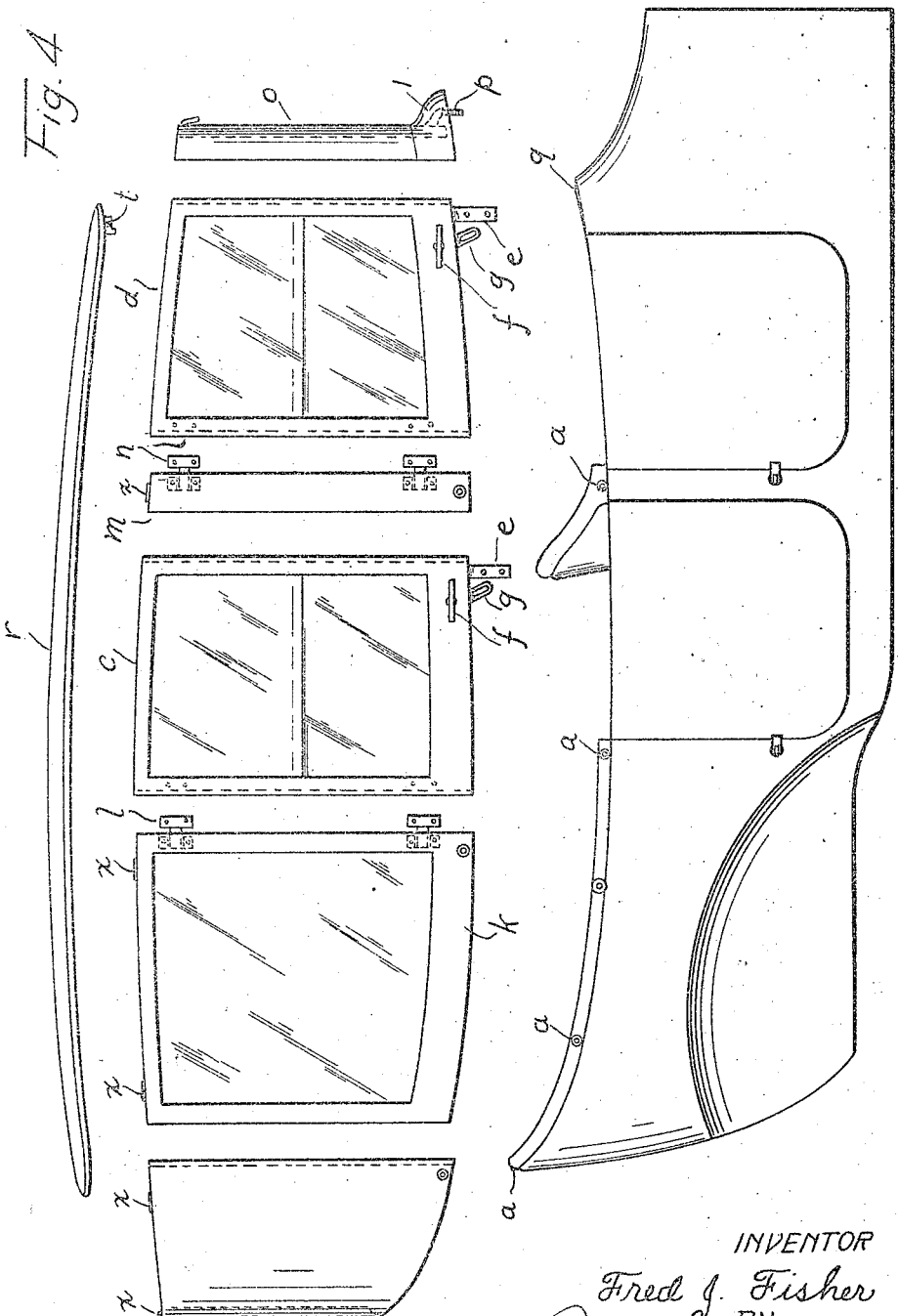
Fig. 4, is a side elevation showing the parts dis-assembled but ready to be put into their various positions.

The so-called convertible bodies that have been in use, or at least most of them, have been failures because of their appearance. They have a decidedly cheap appearance and are very clearly detected by the most casual observer. The object of the present invention is to avoid this and make a limousine top which can be taken off and yet at the same time has all the appearance of a regular limousine or other closed body. To this end the body portion proper, that is the portion which forms the open body when the top is removed, is constructed as shown in the lower portion of Fig. 4. Along the top or trimming rail of the body a number of metal screw-sockets *a* are provided. These are adapted to receive the heavy screws *b* (Fig. 13). By these the various sections which make up the vertical part of the sides and back of the body are held in place. This will be apparent by examining Fig. 1 and Fig. 2. The rear door section *c* (Fig. 4) and the front door section *d* (Fig. 4) are each provided with a metal strip *e* by which the door section of the top may be screwed to the door proper (see Fig. 8). Each door is provided with an ordinary handle *f* which on the inside is provided with a slotted arm *g* (Fig. 8). Through the slot in the end of this arm the handle of the ordinary latch arm *h* of an open body is adapted to protrude; consequently the handle on the closed body very neatly and easily connects with the handle on the open body.

Of course, in this detachable top construction it is not feasible to have window wells to allow the windows to be lowered for ventilation. In place of this, the windows in the doors are made of two slabs of glass (see Fig. 9). These windows are what are known as the sashless variety, that is to say, the upper edges have no sash which interferes with the vision. The upper sash may be dropped with respect to the lower sash by releasing the knob *i* from the top perforation in the metal strap *j*, and held in desired position by means of other perforations in the strap $j$. The rear door section $c$ is attachable to the side section $k$ by hinges $l$; the front door section $d$ it attachable to the door post $m$ by means of the hinges $n$. The front section $o$ is attached to the body by passing the two special bolts $p$ down through holes in the rail $q$ (Fig. 14) which runs around the front of the body at the cowl. These two special bolts are each a casting provided with a plate which may be screwed to the face of the bottom rail of the front section $o$. From this plate extends an arm angularly and downwardly therefrom which is then turned, running parallel with the plate and provided with suitable screwthreads on which a nut may be run.

Figure 3:
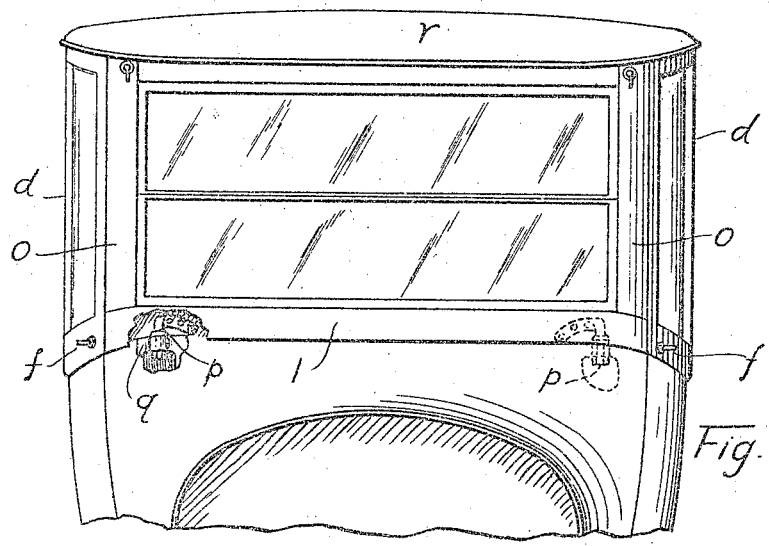
Fig. 3, is a front elevation with a small portion broken away to show one of the fastening devices.

The front section $o$ is provided at each upper corner with a fastening device for locking the front section to the roof section $r$ (Figs. 3 and 14). This fastening device comprises an eccentric $s$ adapted to be rotated through a notch in a depending projection $t$ of the roof. It is apparent that by rotating this eccentric the roof will be drawn down toward the front section in much the same way that the conventional form of sash lock works. Notches are provided in the plate $u$ and a spring-pressed ball $V$ is provided in the eccentric. This tends to hold the eccentric in any given position of rotation.

The other sections, namely the two pairs of door sections, the side sections, and the back are all locked to the roof section $r$ by the devices such as shown in Figs. 10, 11, 12 and 13. These are a special locking device adapted for the purpose in view. They are seen assembled in Fig. 13. The lower member is an angle iron or rather a casting which is provided at its center with a triangular opening $w$, the upper back wall of which is at an angle of about 45 degrees to the other two faces of the casting. The upper face of the casting is provided with a rib $x$ which fits into a recess $y$ in the upper casting so as to cause the two fastening devices to properly register. Similarly, the upper fastening device is provided with a triangular opening at the center adapted to register with the opening $z$ in the upper face of the lower fastening member. Through these coinciding walls a bolt may be obliquely driven, as shown in Fig. 13. This securely draws the roof section to the side section. It will be noted that this type of fastening device is used on the door post, the side sections and the back sections.

The front section is provided with a skirt 1 which extends down over the upper edge of the body at the front so as to both shed water and also improve the appearance by concealing the joint.

What I claim is:—

1. In a convertible vehicle body, the combination of an open body portion, a top portion made up of a plurality of sections which form the front, sides and back, a roof section, and fastening devices for locking the first-mentioned sections to the roof section, each comprising angle plates and screws obliquely driven through the angle plates to draw said sections and the roof section together.

2. In a convertible vehicle body, the combination of an open body portion, a top portion made up of a plurality of sections that form the front, back and sides and roof section, and fastening devices for interlocking the roof section with the first-mentioned sections, said fastening devices comprising each a pair of angle plates one of which plates is provided with a recess and the other with a rib, said rib and recess interlocking, and a screw adapted to be driven obliquely through said plates to lock them together.

3. In a convertible vehicle body, the combination of an open body portion provided with a trim rail having its upper portion reduced in thickness and provided with horizontal screw sockets, a top portion having the lower rail of reduced thickness at its bottom to fit over the reduced top of the trim rail thereby to bring the vertical walls of the top and bottom portion in substantially the same plane, and screws for driving through the reduced portion of the bottom rail of the top into the screw sockets of the said trim rail.

4. In a convertible vehicle body, the combination of an open body portion, a top portion having a front section securable to the cowl of the open body portion and located somewhat to the rear of the rear of the cowl, said front section being provided with a skirt adapted to extend over the space between the front section and the cowl and over the outside of the cowl to act as a water-shed and a joint concealer.

5. In a convertible vehicle body, the combination of an open body portion, a top portion having a front section located to the rear of the rear edge of the cowl, special elbow-like bolts secured to the lower rail of the front section and extending forward therefrom, said bolts being adapted to pass through openings in the open body frame at the rear edge of the cowl and secured by nuts run on the lower ends of the bolts, and a skirt projecting forwardly from the lower part of the front section and arranged to cover the gap left between the front section and the cowl and also to act as a water shed and joint concealer.

6. In a convertible vehicle body, the combination of an open body portion, a top portion having a front section, special bolts having strip-like heads adapted to be screwed to the front of said front section and provided with shank-like depending portions projecting angularly forward and having screw-like lower ends, said shank-like portions adapted to extend through openings in the frame of the open body portion and secured thereto by nuts, and whereby the front section may be located to the rear of the frame of the open body portion, and a skirt adapted to extend over said special bolts and a portion of the cowl to act as a water-shed and conceal the bolts.

In testimony whereof, I sign this specification.

FRED J. FISHER.